(12) United States Patent
Chang et al.

(10) Patent No.: US 7,603,288 B2
(45) Date of Patent: Oct. 13, 2009

(54) PHOTO LABORATORY MANAGEMENT SYSTEM

(75) Inventors: Jae-Jung Chang, San Jose, CA (US); Steven S. Loehnert, Hollister, CA (US); Yoshihiro Adachi, Tokyo (JP); Shuji Kuhara, Kanagawa (JP); Hirokazu Tsuji, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 977 days.

(21) Appl. No.: 10/453,708

(22) Filed: Jun. 4, 2003
(Under 37 CFR 1.47)

(65) Prior Publication Data
US 2004/0059635 A1    Mar. 25, 2004

(30) Foreign Application Priority Data
Sep. 24, 2002   (JP) .................... 2002-277928

(51) Int. Cl.
| | |
|---|---|
| G06G 1/14 | (2006.01) |
| G06Q 20/00 | (2006.01) |
| G06F 3/12 | (2006.01) |
| H04N 1/00 | (2006.01) |
| H04N 1/46 | (2006.01) |

(52) U.S. Cl. ............... 705/22; 358/1.15; 358/1.6; 358/501

(58) Field of Classification Search ............... 705/26
See application file for complete search history.

(56) References Cited

U.S. PATENT DOCUMENTS

| | | | |
|---|---|---|---|
| 5,974,401 A | 10/1999 | Enomoto et al. | |
| 6,104,468 A | 8/2000 | Bryniarski et al. | |
| 6,147,742 A | 11/2000 | Bell et al. | |
| 6,219,129 B1 * | 4/2001 | Kinjo et al. | 355/40 |
| 6,321,133 B1 | 11/2001 | Smirnov et al. | |
| 6,590,671 B1 | 7/2003 | Kinjo | |
| 6,715,003 B1 * | 3/2004 | Safai | 710/33 |
| 2003/0025936 A1 * | 2/2003 | Ouchi et al. | 358/1.15 |

FOREIGN PATENT DOCUMENTS

| | | |
|---|---|---|
| EP | 1 120 728 A2 | 8/2001 |
| EP | 1 137 247 A2 | 9/2001 |
| JP | 10-271251 A | 10/1998 |
| JP | 11-352600 A | 12/1999 |
| JP | 2000-049990 A | 2/2000 |
| JP | 2001-243365 A | 9/2001 |
| JP | 2001-249990 A | 9/2001 |
| JP | 2001-268253 A | 9/2001 |
| JP | 2001-281768 A | 10/2001 |
| JP | 2001-350213 A | 12/2001 |
| JP | 2001-350834 A | 12/2001 |
| WO | WO 01/16652 A1 | 3/2001 |

* cited by examiner

Primary Examiner—F. Zeender
Assistant Examiner—Faris Almatrahi
(74) Attorney, Agent, or Firm—Sughrue Mion, PLLC

(57) ABSTRACT

The photo laboratory management system manages a photo laboratory utilizing a digital photo print system and includes an order entry function of receiving an order from a customer by receiving order information that includes at least identification information of the customer, a type and a form of an original image from the customer, a type, a form, and a number of copies of an output image ordered by the customer, an order management function of managing the order information received from the customer and a workflow management function of managing a schedule according to which the order received from the customer is to be processed, and predicting a time required for finishing the output image ordered by the customer. Productivity in the digital photo print system can be improved and order automation is possible. The time required to process the order can be automatically estimated.

8 Claims, 9 Drawing Sheets

PHOTO LABORATORY MANAGEMENT SYSTEM

BACKGROUND OF THE INVENTION

1. Field of the Invention

The present invention relates to a photo laboratory management system, and more particularly to a photo laboratory management system that manages a photo laboratory and is provided with various functions for managing a workflow in a photo laboratory from the reception of an order, through the output of an output image (finished product) such as a photographic print, a medium (image data recording medium) on which photographic image data has been recorded, or photographic image data itself, to the delivery of the finished product to a customer, for enhancing workability and operability concerning a multifunctional digital photo printer, and for improving productivity in a digital photo print system that uses the multifunctional digital photo printer.

2. Description of the Related Art

A conventional analog photo printer deals with a negative film and directly performs exposure and printing on photographic paper (printing paper) using image projection light having passed through the negative film. Compared with this conventional analog photo printer, a digital photo printer is multifunctional, is capable of performing input and output in a wide variety of forms, and is capable of performing various image processing, which however requires complicated operations.

For instance, in addition to a negative film, it is possible to deal with various input sources such as a reversal film, digital image data photographed by a digital still camera (DSC) and recorded on an image data recording medium like SmartMedia™, and digital image data recorded on an image data recording medium like an FD (flexible disc), CD-R, or Photo CD™. As to an ordering method, it is possible to use a plurality of routes such as the counter of a photo laboratory (laboratory, photo studio, photographer) or a network.

On the other hand, in addition to the ordinary outputting onto the photographic paper (printing paper), there are various output forms such as the outputting onto a postcard or outputting of image data onto an image data recording medium like an FD or CD-R.

These input and output operations and various processing can be realized with a digital photo printer so that apparatuses are made more multifunctional. With such a construction, a digital photo print system using the digital photo printer also is made more multifunctional and is more complicated.

Examples of such a complicated, multifunctional digital photo print system include the "image server system and image service system" disclosed in JP 2001-243365 A, the "device management system" disclosed in JP 2001-268253 A, and the "image service system" disclosed in JP 2001-249990 A.

The various systems disclosed in these documents are capable of reducing the number of judgments to be made by a user or an operator in charge (worker in the laboratory), performing the operations from order reception to outputting with higher efficiency, providing speedy image service, and performing a maintenance work based on precise information for a plurality of digital photo printers connected via communication lines through a communication network.

In the various systems disclosed in these documents, however, when viewed from the user, the operation of the digital photo printer is complicated as a whole and it takes much time to master the operation, which was an inevitable problem because of the fact that even if the whole operation of the digital photo printer is made simpler, the number of operation screens is unavoidably increased and the operation is complicated due to the multifunctionality of the digital photo printer.

This situation gave rise to a problem that the operator at the laboratory is required to have a higher level of skill than before, which results in an increase in cost.

At an ordinary laboratory, the details of an order from a customer (instructions concerning how to satisfy customer's request) are written on an envelope for development and printing (hereinafter referred to as "DP envelope") and this DP envelope is used when an operator sets up an apparatus (digital photo printer) to finish a product ordered by the customer. In this process, the operator must understand the meaning of the instructions written on the DP envelope and correctly set up the apparatus in order to obtain a result meeting the customer's request. The problem associated with this function is that the operator must read the instructions written on the DP envelope at each stage of order processing, which may cause errors more frequently. The errors lower productivity and incur an increase in cost due to reoperation or remaking.

The control of a workflow at a retail store for producing photographic prints ordered by the customer using an apparatus (photo printer) which can provide speedy photofinishing service ("one-hour photofinishing service", for instance), is a manually performed process. As described above, the customer information and the details of his/her order are written on a DP envelope that is used to manage the order from the customer during processing at the laboratory. This order is dealt with in a first-in first-out manner and productivity is based on the capacity of the apparatus and the skill level of the operator at the laboratory. This manually performed workflow process has been sufficient until digital image output services, such as the printing from digital images, the writing of images onto a CD, and the uploading of images to the Internet, are introduced in addition to a conventional film processing and print order processing. The new services based on digital sources lead to a situation where a conventional workflow used at an ordinary laboratory that provides only the film developing and print processing service is collapsed by the additional services that the laboratory needs to provide but exceed the range of the conventional workflow. The new services introduced into the workflow at the laboratory may cause an operator to make errors more frequently, which results in a delay in completion of order processing due to the misjudgment of priorities in a schedule the operator of the laboratory must follow.

In view of this problem, JP 2001-281768 A discloses a "method for ordering a commodity obtained by photofinishing processing and/or service, and package and label thereof", and provides a system for receiving and recording a photofinishing order from a customer for commodities obtained by photofinishing processing and/or service, as exemplified by a photographic print obtained by printing, reprinting or enlargement, image data recording medium like a CD on which photographic image data has been recorded, image-attached commodities like clothes or ceramics on which images have been printed, distribution of photographic image data via a communication network like the Internet.

U.S. Pat. No. 6,104,468 and JP 2000-049990 A corresponding to this US patent disclose a workflow method with which the image traffic on a network is improved and contain a guideline according to which an image signal is sent to a special image processor or output apparatus only when the network traffic must be suppressed to the minimum level.

Further, the invention disclosed in U.S. Pat. No. 6,147,742 and JP 11-352600 A corresponding to this US patent relate to a photofinishing system and a method therefor, and more particularly to an automatic photofinishing system and a method of managing and processing audio data and image data.

However, the inventions disclosed in these patent documents do not suggest that schedule management and processing of an order containing an image, delivery of commodities and management of a workflow are performed based on the processing capacity of an apparatus, the construction of the apparatus, the number of operators, scheduled work hours, a current work load, and a time limit determined by a workflow adviser that issues a notification to an operator when an operation that is important in maximizing productivity is waiting for processing.

Further, in accordance with the rapidly achieved widespread use of digital still cameras (DSCs), the digitalization of services provided at photo laboratories makes rapid progress and digital photo printers (in particular, small-sized digital photo printers) come also rapidly into widespread use. Along with this situation, new services such as the printing of DSC images and the writing of photographic image data onto CD-Rs are added to service contents at the photo laboratories that have conventionally been limited to a print service only from a photographic film like a negative film, as described above. This leads to a situation where the number of kinds of services provided at the photo laboratory is nearly tripled compared with a conventional case. Consequently, productivity is lowered and an operator requires a higher level of skill due to the necessity of dealing with complicated services, which becomes a cause of an increase in overall cost. As a result, the photo laboratory may suffer from squeezed profitability.

SUMMARY OF THE INVENTION

A main object of the present invention is to solve the conventional problems described above by providing a photo laboratory management system that is capable of managing a photo laboratory and is provided with various functions for managing a workflow in a photo laboratory from the reception of an order with an input image, through the output of an output image, to the delivery of the output image to a customer, for enhancing workability and operability concerning a multifunctional digital photo printer, and for improving productivity in a digital photo print system that uses the multifunctional digital photo printer.

In addition to the main object described above, another project of the present invention is to provide a photo laboratory management system that is capable of preventing the lowering of productivity due to the diversification of input/output services provided by a digital photo print system resulting from the advancement of digitalization of services provided at a photo laboratory, making full use of the functions and high capacity of a multifunctional digital photo printer, presenting a new value-added service with which the amount of sales at the photo laboratory can be increased, and presenting various measures to improve productivity, improve a system capacity, enhance operability, and realize cost reduction.

Still another object of the present invention is to provide order automation, more specifically, a photo laboratory management system that is capable of realizing order automation with which the efficiency in an order processing process can be improved by saving the labor required for the repetitive inputting of order information at different stages of order processing.

Yet another object of the present invention is to provide a photo laboratory management system that is capable of automatically estimating a time required to process an order in accordance with a priority, currently available resources, and a work load so that an optimum time limit is set and a product can be delivered on time.

In order to attain the above-mentioned objects, the present invention provides a photo laboratory management system which manages a photo laboratory utilizing a digital photo print system by which a customer is provided with an image output service for outputting an output image including at least one of a photographic print and photographic output image data from an original image including at least one of the photographic film and photographic input image data, comprising an order entry function of receiving an order from the customer by receiving order information that includes at least identification information of the customer, a type and a form of the original image from the customer, a type, a form, and a number of copies of the output image ordered by the customer; an order management function of managing the order information received from the customer; and a workflow management function of managing a schedule according to which the order received from the customer is to be processed, and predicting a time required for finishing the output image ordered by the customer.

Preferably, hardware resources of the digital photo print system includes an order reception machine provided with at least the order entry function, a server provided with at least the order management function and the workflow management function and a digital photo printer that obtains the original image as digital image data and outputs the output image from the digital image data obtained.

Preferably, the photo laboratory management system mentioned above further comprises a customer information management function of managing customer information.

and, preferably, the photo laboratory management system further comprises an order tracking function which is capable of specifying the order from the customer and checking a state of the specified order.

And, preferably, the photo laboratory management system further comprises a processing state display function of displaying a list in which the order from the customer is arranged in a sequence of processing and an automatic setting function of automatically setting the order information from the customer in an operation screen of the digital photo printer that obtains the original image as digital image data and outputs the output image from the digital image data obtained.

Preferably, the photo laboratory management system further comprises a production information management function of managing production information concerning the digital photo print system.

And, preferably, the photo laboratory management system further comprises a remake function of remaking the output image in the digital photo printer that obtains the original image as digital image data and outputs the output image from the digital image data obtained.

DETAILED DESCRIPTION OF THE PREFERRED EMBODIMENTS

Hereinafter, the photo laboratory management system according to the present invention will be described in detail based on the preferred embodiments shown in the accompanying drawings.

Figure 1:
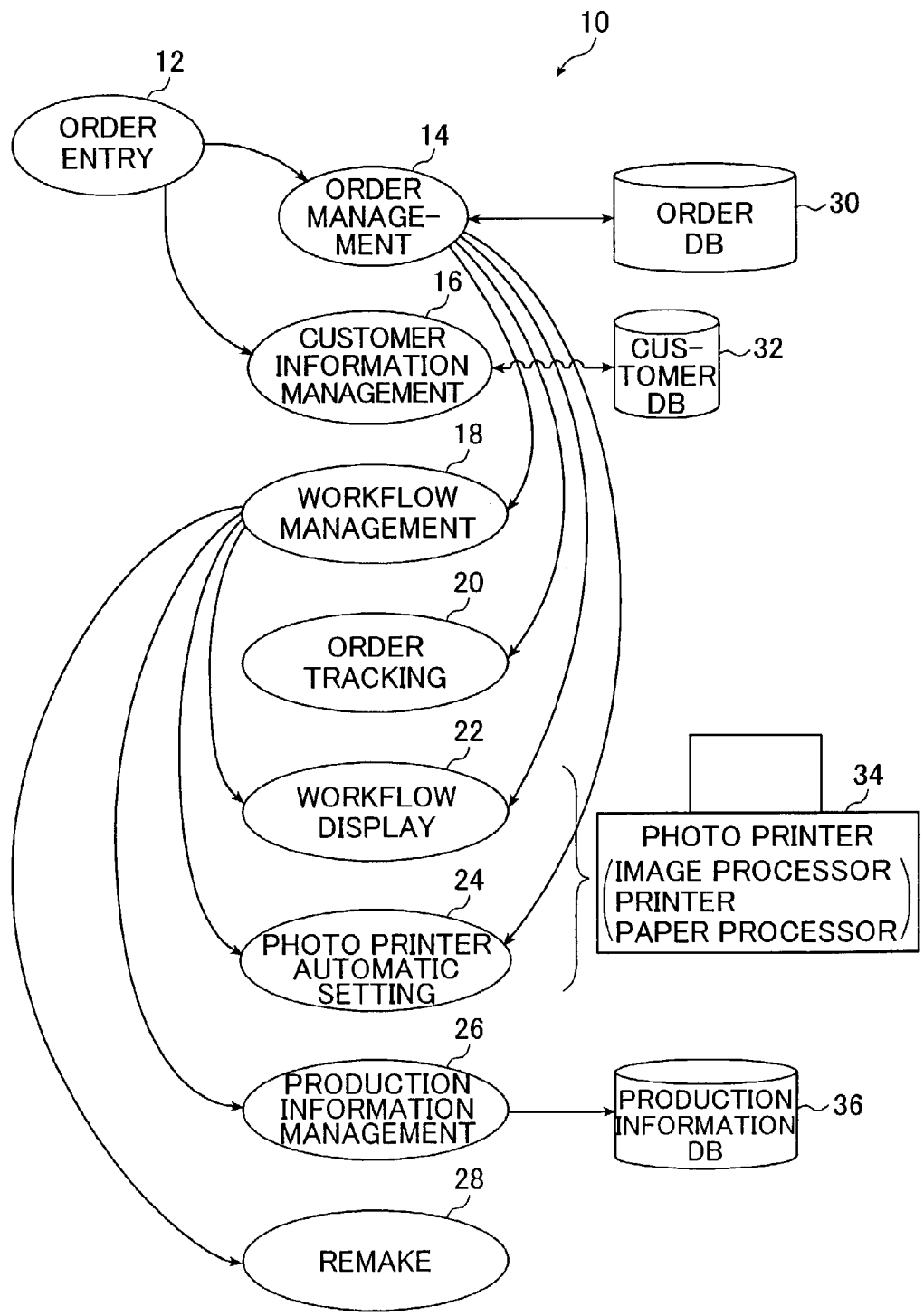
FIG. 1 is a block diagram showing the schematic construction of an embodiment of the photo laboratory management system according to the present invention.
Figure 2:
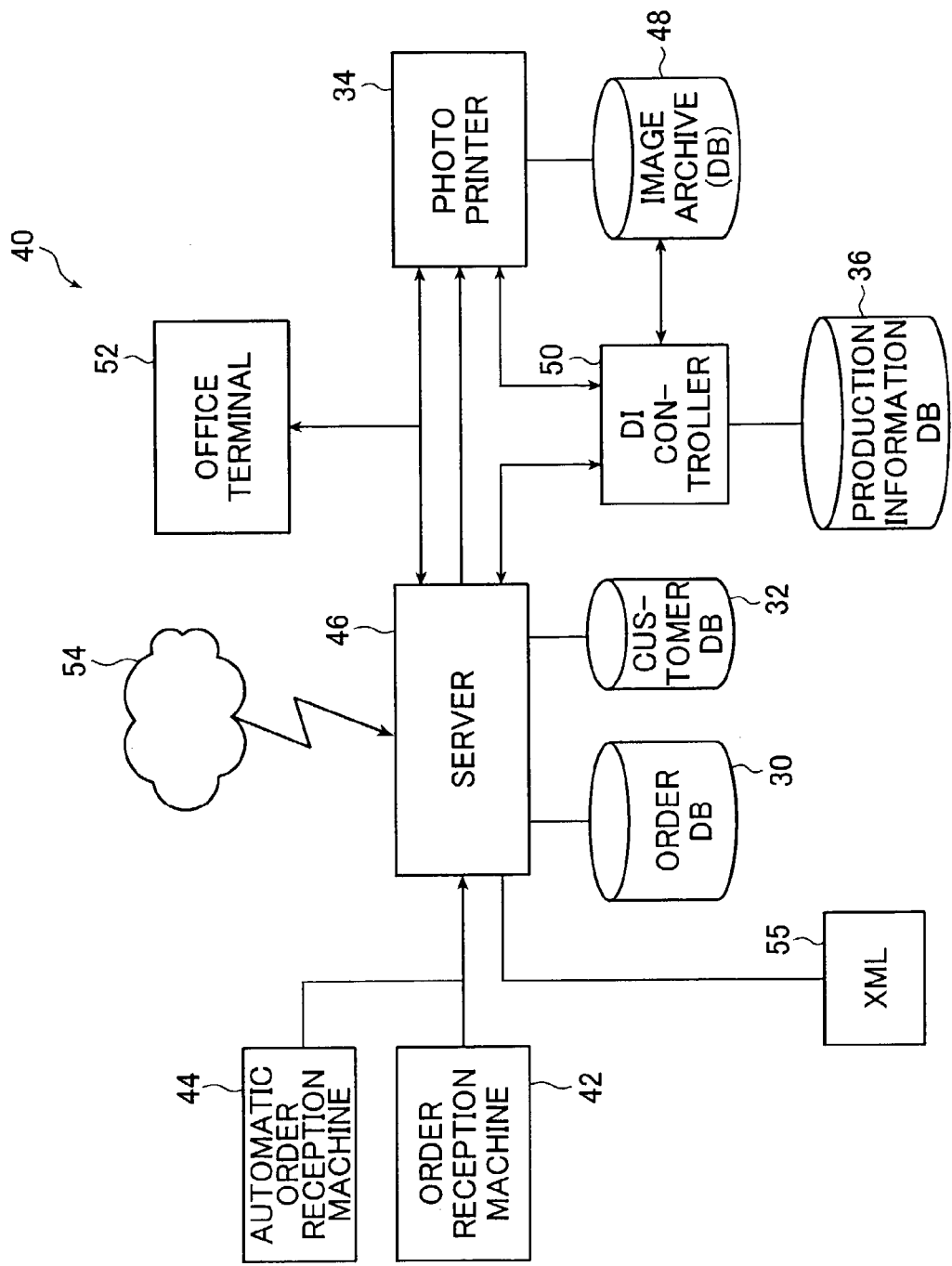
FIG. 2 is a block diagram showing the schematic construction of an embodiment of a digital photo print system to which the photo laboratory management system shown in FIG. 1 is applied.

FIG. 1 is a block diagram showing the schematic construction of an embodiment of the photo laboratory management system of the present invention. FIG. 2 is a block diagram showing an embodiment of the schematic hardware construction of a digital photo print system to which the photo laboratory management system of the present invention is applied.

As shown in FIG. 1, the photo laboratory management system (hereinafter referred to as the "management system") 10 of the present invention is provided with an order entry function module 12, an order management function module 14, a customer information management function module 16, a workflow management function module 18, an order tracking function module 20, a workflow display function module 22, a digital photo printer automatic setting function (hereinafter referred to as the "automatic setting function") module 24, a production information management function module 26, and a remake function module 28. The management system 10 further includes an order information database (hereinafter referred to as the "order DB") 30 which stores order information to be dealt with by the order entry function module 12, a customer information database (hereinafter referred to as the "customer DB") 32 which stores customer information to be dealt with by the customer information management function module 16, a digital photo printer (hereinafter referred to as the "photo printer") 34 in which the workflow display function module 22 and the automatic setting function module 24 are incorporated, and a production information database (hereinafter referred to as the "production information DB") 36 which stores production information to be dealt with by the production information management function module 26.

On the other hand, as shown in FIG. 2, the digital photo print system (hereinafter referred to as the "print system") 40 to which the photo laboratory management system 10 is applied comprises the following hardware resources.

The print system 40 shown in FIG. 2 includes an order reception machine 42 that is placed at a laboratory (at the counter thereof, for instance), an automatic order reception machine 44 placed at the laboratory, a system management server 46, the order DB 30 and the customer DB 32 that are connected to this server 46, the photo printer 34, a photographic image data accumulation image archive 48 that is connected to this photo printer 34, a digital image controller (hereinafter referred to as the "DI controller") 50, and an office terminal 52. Here, the server 46 is connectable to a communication network 54 such as the Internet and is also connectable to another photo printer, to the order reception machine, the automatic order reception machine, or the photo printer of another system, or to the like via an XML terminal 55.

In the management system 10 of the illustrated embodiment, the order entry function module 12 has a function of receiving and registering an order from a customer and performing an amendment to registered customer information or order information, with this order entry function being realized by reception machine software. This reception machine software is installed on the order reception machine 42 and the automatic order reception machine 44.

The order entry function module 12 is linked to the order management function module 14 and the customer information management function module 16, and the order information and customer information received from the customer by the order entry function module 12 are respectively sent to the order management function module 14 and the customer information management function module 16 and are respectively stored in the order DB 30 and the customer DB 32.

The order information includes an order number (order ID), customer identification information (customer ID), an order date and time, a film type (color negative film, black and white film, reversal film), a film size (135-type (12-, 24-, 36-exposure film), APS type (15-, 25-, 40-exposure film), 120-type, 110-type, or another type)/media type (SmartMedia™ (SM), XD (extreme Digital Picture™), CF (CompactFlash (registered trademark)), MS (Memory Stick™), SD (Secure Digital™), PCC (PC Card), CD-R, Photo CD™, MO, ZIP, FD, or another type), printing with film processing/reprinting, enlargement, a print size (L, 2L, king, cabinet, another size)/number of copies (one, two, another number)/a surface type (glossy, mat, silky, another type)/the presence or absence of edges (borders), whether an index print is required or not (number of copies), whether a digital output service has been ordered (number of copies), whether a special printing service has been ordered (frame printing, postcard printing, another printing), whether the uploading to the Internet has been ordered, a finishing method (extremely urgent (one-hour) finishing, urgent (one-day) finishing, ordinary finishing, another finishing method), and the like.

The order management function module 14 has a function of registering order information received by the order entry function module 12 in the order DB 30, managing the registered order information from the customer, processing a request to register/delete/amend the order from the customer, registering the processed order information from the customer in the order DB 30 again, recording and managing an order history as well as the current order, and performing various settings of the server 46. This order management function is realized by server software.

The order management function module 14 is linked to the workflow management function module 18, the order tracking function module 20, the workflow display function module 22, and the automatic setting function module 24, and the order information from the customer managed by the order management function module 14 is sent to each of these function modules 18 to 24.

Meanwhile, the customer information management function module 16 has a function of managing the customer information, with this customer information management function being realized by customer management software. This customer management software is included in the server software.

Here, the customer information includes customer identification information (customer ID), such as an ID number assigned to a customer, and his/her name, address, and telephone number, for instance. As additional information, it is possible to cite the occupation, family structure, and hobby of the customer. The customer information is registered in the customer DB 32 and is managed by the customer information management function module 16.

The workflow management function module 18 has a function of performing the scheduling of processing of each order at the print system 40 (in particular, at the photo printer 34) and predicting a time at which the processing of each order will be finished. This workflow management function is realized by workflow management software, with this workflow management software being included in the server software.

The workflow management function module 18 is linked to the workflow display function module 22, the automatic setting function module 24, the production information management function module 26, and the remake function module 28. The order information, for which scheduling has been performed by the workflow management function module 18, is sent to each of these function modules 22 to 28.

The server software having the order management function, customer information management function (customer management software), and workflow management function (workflow management software) is installed on the server 46.

The order tracking function module 20 realizes a function of displaying the current state of an order specified using an order ID on a display device that is a hardware resource, thereby making it possible to check the current state of the order. This order tracking function is realized by reception machine software that is installed on the order reception machine 42 and the automatic order reception machine 44.

The workflow display function module 22 has a function of displaying orders as a list, in which the orders are arranged in the order in which they should be processed, on the display device that is a hardware resource. This workflow display function can be referred to as a processing state display function or a processing work order display function. This workflow display function 22 is realized by photo printer software.

The automatic setting function module 24 has a function of automatically setting order information in an operation screen of the photo printer 34, with this photo printer automatic setting function being realized by the photo printer software.

The photo printer software having the workflow display function and photo printer automatic setting function is installed on the photo printer 34.

The production information management function module 26 has a function of registering production information concerning the print system 40 (in particular, concerning the photo printer 34) in the production information DB 36, managing the registered production information, and enabling the reference to the production information through a browser on the Web or the like. The production information management function is realized by production management software, with this production management software being included in DI controller software.

The production information includes the kinds or types of various devices provided in the photo system 40, the kinds or types of input and output images that the photo system 40 is capable of dealing with, the kinds or types of loaded color paper, the remaining amounts of the paper, the kinds or types of CD-Rs, the remaining numbers of the CD-Rs, the kinds or types of developers, the processing amounts (usage times) of the developers, and the like. The production information management function module 26 manages the production information.

The remake function module 28 has a function of, when the finishing quality of produced photographic prints is insufficient, checking again the photographic prints based on their corresponding scan images (digital image data) in a photographic film stored in the image archive 48 and reprinting the images, with this remake function being realized by the DI controller software. Note that this remake function is based on the assumption that the scan image data of the photographic film is stored in the image archive 48 connected to the photo printer 34. Here, the image quality depends on the resolution of the scan image data stored in the image archive 48, although the resolution is considered to be approximately the same as that of output image data outputted onto a CD-R, and the resolution is approximately the same as that of prints from a CD.

The DI controller software having the production information management function and remake function is installed on the DI controller 50.

As described above, the management system 10 of the present invention is classified into four kinds of software: the reception machine software that includes the order entry function module 12 and the order tracking function module 20 and is installed on the order reception machine 42 and the automatic order reception machine 44; the server software that includes the order management function module 14, the customer information management function module 16, and the workflow management function module 18 and is installed on the server 46; the photo printer software that includes the workflow display function module 22 and the photo printer automatic setting function module 24 and is installed on the photo printer 34; and the DI controller software that includes the production information management function module 26 and the remake function module 28 and is installed on the DI controller 50. However, the present invention is not limited to this.

For instance, in many small-scale photo laboratories, the order reception machine 42 is not separated from the server 46 but they are used as a single order reception PC (personal computer)/DB server. In this case, the management system 10 may be classified into six kinds of software including order reception/management software obtained by combining the order entry function module 12, the order tracking function module 20, and the order management function module 14 with each other, customer management software including the customer information management function module 16, workflow management software including the workflow management function module 18, production management software including the production information management function module 26, remake function software including the remake function module 28, and the photo printer software used as it is.

In this case, the order reception and management software, the customer management software, and the workflow management software are installed on the order reception PC/DB server. That is, this means that the reception machine software and server software described above are installed on the order reception PC/DB server.

Needless to say, even in this case, the order reception PC/DB server may be separated into the order reception machine 44 and the server 46 as shown in FIG. 2.

The workflow management software, the production management software, and the remake function software are installed on the DI controller 50.

Here, the production management software may be installed on another personal computer (hereinafter referred to as "PC"), such as a PC located rearward in the laboratory or in a separate office or a PC connected via a network so that production information can be checked.

It should be noted here that the photo printer software can be also called operation automation and workflow (work order) display software taking account of its function. It is possible to install the photo printer software on various types of photo printers.

Next, there will be described each hardware resource of the print system 40 shown in FIG. 2 on which the software having each function module of the management system 10 in FIG. 1 constructed as described above is installed.

The order reception machine 42 is placed at the counter or the like of a laboratory and is used by an operator to receive an order from a customer. That is, the operator uses this machine to input, receive, and register order information, such as order contents and order items. The order reception machine 42 usually includes a PC equipped with a monitor display screen. Note that in the case where the order reception machine 42 is separated from the server 46 as shown in FIG. 2, this machine can be used as a machine exclusively used by an order reception operator.

The automatic order reception machine 44 is used by a customer to give and register a simple order by himself/herself. This machine 44 usually includes a PC equipped with a monitor display screen.

In addition to the monitor (display), the PCs constituting the order reception machine 42 and the automatic order reception machine 44 may be equipped with input devices such as a keyboard and a mouse, and a memory or a storage apparatus (HDD) for temporarily storing the order information, application, software, and the like. The PCs may also be equipped with a media drive for reading image data, application, software, and the like out of a medium such as a DSC, CD, MO, or FD.

On the order reception machine 42 and the automatic order reception machine 44, is installed the reception machine software including the order entry function module 12 and the order tracking function module 20. As described above, the order reception and management software that also includes the order management function module 14, the customer management software including the customer information management function module 16, and the workflow management software including the workflow management function module 18 may be installed on these reception machines so as to get access to the order DB 30 or the customer DB 32 from the reception machines. The order reception machine 42 and the automatic order reception machine 44 may be constructed so that the order information, the customer information, and the workflow management information (processing state, work order, and the like) can be inputted, outputted, and referred to from the server 46 on which the function modules described above are installed.

In this management system 10, in order to provide the customer with a meticulous service, the customer information is stored and managed in the customer DB 32 by the customer information management function module 16, and customer cards that associate the customer information with customers are issued to the customers. In this case, the order reception machine 42 and the automatic order reception machine 44 can access the customer DB 32 to obtain the customer information merely by reading the barcodes on the customer cards or reading the customer IDs from magnetic recording portions, which can eliminate the necessity for the labor required for inputting the customer information, leading to a speed up in the reception of orders.

Further, the order reception machine 42 and the automatic order reception machine 44 use the obtained customer IDs to get access to the order DB 32 which stores order information managed by the order information management function module 14, whereby the order contents of previous orders (history of previous orders) can be obtained and displayed on the monitor.

Further, the order reception machine 42 and the automatic order reception machine 44 may display a finishing time concerning the order from a customer predicted by the workflow management function module 18 on the monitor.

It is preferable that the order reception machine 42 and the automatic order reception machine 44 are equipped with a printer for printing out, after the order is fixed, an order reception slip (receipt print) on which received and registered order information, a scheduled finishing time, and the like are recorded. Here, it is preferable that the printer outputs at least two order reception slips, one of them is handed to the customer as an exchange ticket for receiving a finished commodity such as photographic prints or a CD, and the other is affixed at a predetermined position of the front surface of a DP envelope for putting therein a photographic film, a medium, or the like that the customer brought to the laboratory.

It is preferable that a customer's name, his/her telephone number, his/her customer ID, an order number, the contents of the order (order information), a scheduled finishing time, a bill, and the like are recorded on the order reception slip.

The automatic order reception machine 44 is provided with an enclosure having a slot through which a DP envelope is inserted into the enclosure. A customer registers an order by himself/herself, outputs two order reception slips from the printer, puts a photographic film or a medium in the DP envelope, affixes one of the order reception slips to the DP envelope, and inserts the DP envelope through the slot. In this manner, automatic order reception is completed.

Here, the order reception machine 42 and the automatic order reception machine 44 include the order entry function module 12. With this construction, even an unskilled and unaccustomed operator can easily input the kind and quantity of an order from a customer with reliability to receive and register the order without difficulty by merely one-clicking each button that corresponds to the kind of the order and that is prepared in an order reception (input) screen displayed as a GUI (graphical user interface) on the display screen of the monitor of the order reception machine 42 or the automatic order reception machine 44. If an order is not complicated, it is possible even for an unaccustomed customer to perform the input, reception, and registration of the order by himself/herself. That is, the order reception operation at a photo laboratory can be simplified.

Figure 3:
FIG. 3 is an example of an order screen in an order entry GUI of an order reception machine of the digital photo print system shown in FIG. 2.

FIG. 3 shows an example of the order entry GUI.

As shown in FIG. 3, the order entry GUI is provided with various kinds of order buttons (macro settings) with which a plurality of pieces of order information can be inputted by one operation. For instance, the inputted order information specifies "one print having print size of 10×15 from each frame of a 24-exposure 135-type negative film and the printing with film processing of an index print". It is possible to register a plurality of pieces of order information concerning an order by merely one-clicking one of these buttons. Also, in the case where this one-click button scheme is not used or in the case where it is required to input further detailed order information, only the necessary items corresponding to the further detailed order information are arranged and displayed in a magnified manner, which makes it possible to selectively click these displayed items to register the order information. Note that, as described above, the order information includes many pieces of information, so that in the case where further selection or input is required, necessary selection items are sequentially magnified, arranged, and displayed to urge an operator or a customer to make selections. As a result, it is possible for the operator or the customer to register an order with extreme ease by sequentially clicking the displayed items.

Further, as to these one-click buttons, setting of a new one-click button and change in the setting contents by a user, that is, in a photo laboratory are possible, which means that it is possible to customize the one-click buttons for each photo laboratory. For instance, an order pattern frequently seen at each photo laboratory can be used in the form of a one-click button.

It should be noted here that the order reception machine 42 and the automatic order reception machine 44 can use their order entry function module 12 to register an order of a photographic film such as a negative film or a reversal film and an order of a medium (image data recording medium), such as SmartMedia on which image data obtained by a digital still camera (DSC) is recorded or a CD on which photographic image data is recorded.

Here, in the case of the reception of an order for a medium such as a DSC, it is possible to immediately extract (copy) necessary image data or all image data from the received medium then and there by directly using the order reception machine 42 or the automatic order reception machine 44 and to return the received medium to the customer then and there.

During this operation, it is possible to specify necessary frames from among a list of DSC images extracted from the medium and displayed on the monitor of the order reception machine 42, the automatic order reception machine 44, or the like.

Further, in the present invention, it is possible to register the reordering or reprinting for each necessary frame of a photographic film through the order entry GUI on the monitor of the order reception machine 42, the automatic order reception machine 44, or the like.

It should be noted here that the order reception machine 42 and the automatic order reception machine 44 have the order tracking function module 20, so that by specifying an order from a customer, the processing state of the specified order can be checked through a display screen of the monitor. Further, the order tracking function module 20 also has an order editing function and is also capable of changing the contents of the specified order that is displayed on the display screen of the monitor.

Figure 4:
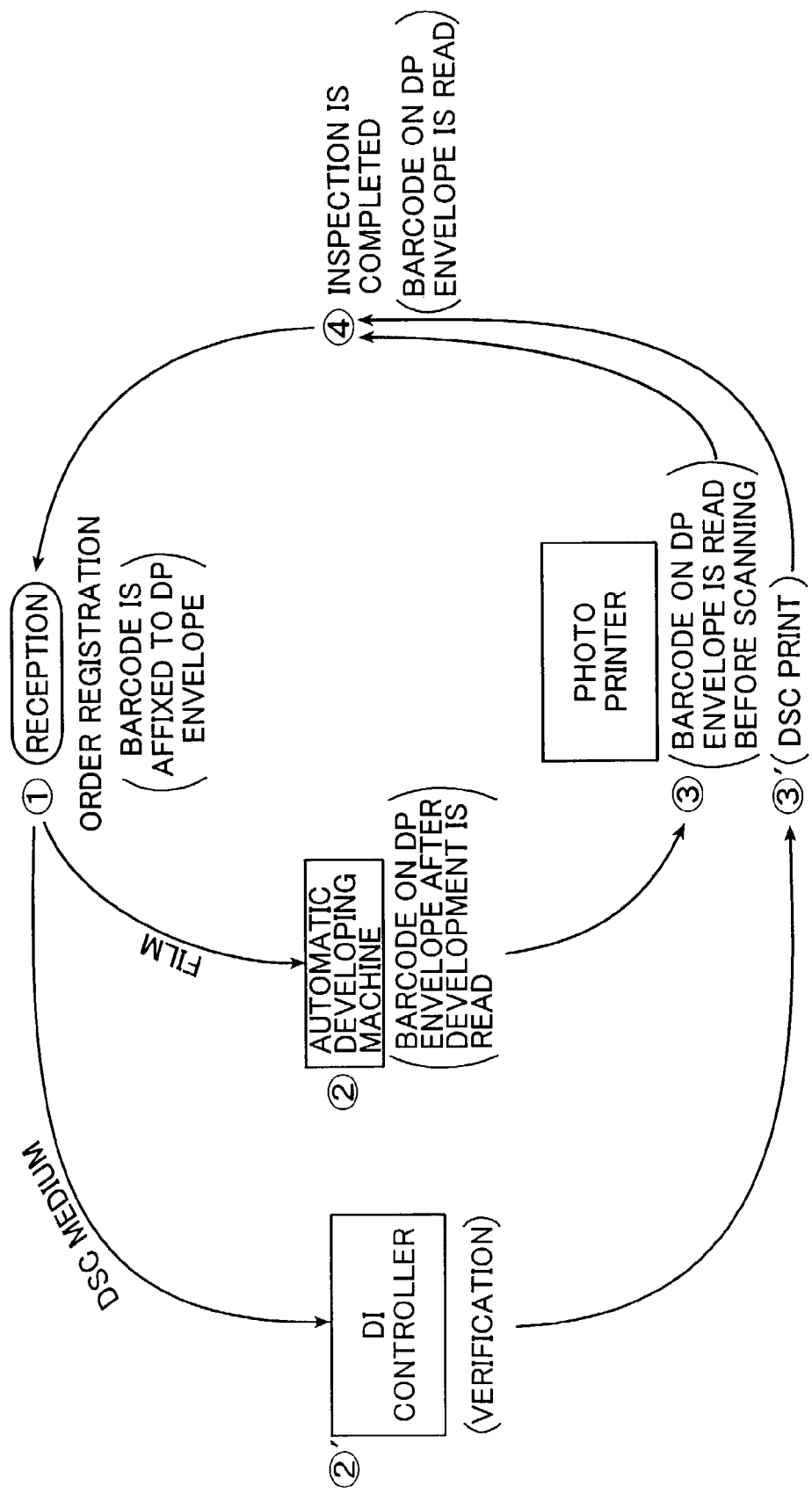
FIG. 4 is an explanatory diagram for illustrating an order tracking function of the photo laboratory management system of the present invention.

For instance, as shown in FIG. 4, in the case of an order for a photographed film, a current processing state of the film is obtained and is displayed on the monitor, although this point will be described in detail later. Here, the current processing state is one of (1) the registration of an order at a reception desk, (2) film development by an automatic developing machine (reading of the barcode of a DP envelope in which a developed film is put), (3) creation of prints by the photo printer 34 (reading of film images, digital exposure, development, drying; reading of the barcode on the DP envelope before film scanning), and (4) completion of inspection (reading of the barcode on the DP envelope).

It should be noted here that even in the case of DSC images, a current processing state of these images is obtained and the obtained processing state is displayed on the monitor like in the case of an order for a photographed film. In this case, the processing state in this case is one of (1) the registration of an order at a reception desk, (2') image verification by the DI controller, (3') creation of prints by the photo printer 34 (digital exposure, development, drying), and (4) completion of inspection.

The order reception machine 42 and the automatic order reception machine 44 that perform the order reception processing and management are basically constructed as described above.

In the print system 40 shown in FIG. 2, the server 46 manages the whole of this management system 10, and in particular manages the flow of the whole of the system. The server 46 also functions as a database (DB) in which various kinds of information such as the order information and the customer information are stored, and usually includes a PC equipped with a monitor display screen and a mass storage device like a hard disc (HDD). In addition to the monitor, this PC may also be equipped with input devices such as a keyboard and a mouse, and a memory or a storage apparatus for temporarily storing the order information, application, software, and the like.

In the illustrated example, the order DB 30 and the customer DB 32 are connected to this server 46 as such databases, with these databases being respectively used to store the order information and the customer information. However, these databases may be provided using one hardware resource or different hardware resources. Note that in the present invention, as described above, a single PC having the functions of both of the order reception PC and the DB server may be used for the server 46 and the order reception machine 42.

The server software including the order management function module 14, the customer information management function module 16, and the workflow management function module 18 is installed on the server 46. However, the order reception and management software including the order entry function module 12, the order tracking function module 20, and the order management function module 14 in combination, the customer management software including the customer information management function module 16, and the workflow management software including the workflow management function module 18 may be installed on the server 46.

At the server 46, the order management function module 14 performs various kinds of settings of the server 46. In addition, as described above, this order management function module 14 is linked to the order entry function module 12 and accesses the order DB 30. With this construction, the order management function module 14 executes and manages the search for the order information, and reading and writing of the order information, manages the order information stored in the order DB 30, and performs processing to issue a request to register/delete/amend an order. These points have already been described in the above explanation concerning order reception and management, so that a description thereof will be omitted.

The customer information management function of the customer information management function module 16 at the server 46 has already been described in the above explanation concerning order reception and management, so that a description thereof will be also omitted.

In the management system 10 of the present invention, the server 46 is provided with the workflow management function module 18, so that it is also possible to provide a laboratory operation with a method with which a workflow is controlled using software that determines a schedule based on the processing capacity of an apparatus (photo printer 34), the construction of the apparatus, the number of operators, scheduled work hours, a current work load, a workflow display function (workflow adviser) that issues a notification to an operator when an important operation is waiting for processing, and the like.

A feature of this workflow management function is that there is provided a method with which a time required to process an order can be automatically estimated in accordance with a priority, currently available resources, and a work load so that an optimum time limit is set and a product can be delivered to a customer on time.

Figure 5:
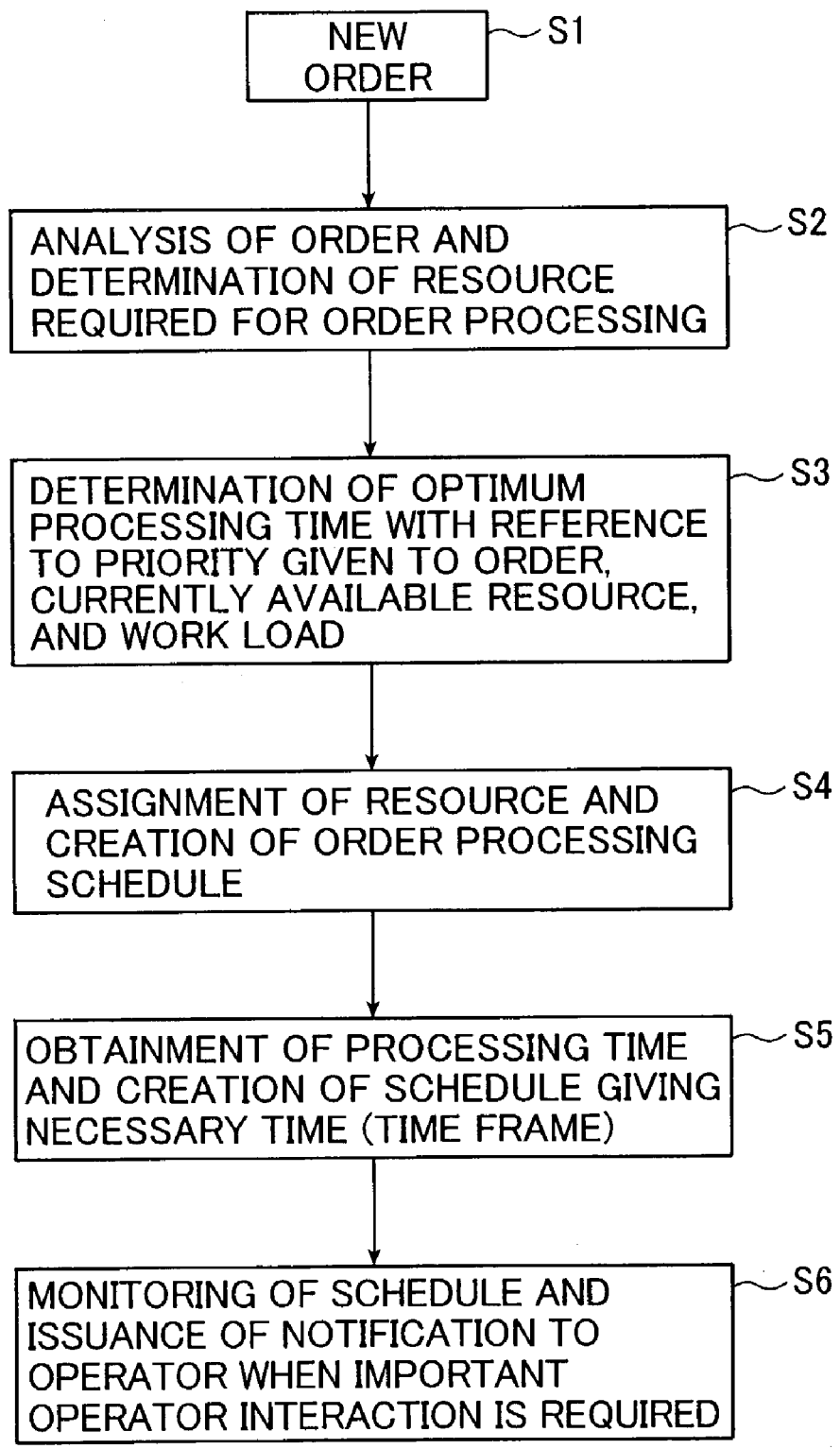
FIG. 5 is a flowchart showing an example of a method of predicting a time required to process an order in the photo laboratory management system of the present invention.

The unique feature of this method is to find an optimum schedule for an order taking account of an apparatus construction, an apparatus performance, the priority of the order, a balance among work loads, and the like. This feature is important because of the difficulty in optimizing the schedule for order processing under many conditions. FIG. 5 shows an example of a flowchart of an order processing time prediction method that includes the estimation of a processing time and the creation of a schedule.

As shown in FIG. 5, firstly, when a new order is registered (step S1), this order is analyzed (step S2). An image medium and a service product type that are order items included in order information are used to determine each resource that is necessary to complete the order processing.

Secondly, the current state and work load of each apparatus are checked and an optimum processing time is determined in accordance with the priority of the order, currently available resources, and the work load (step S3). The information showing apparatus performance is used to estimate a processing time for hardware that creates a product. The order processing is performed in a first-in first-out manner, although the order with the higher priority will be processed first.

Thirdly and fourthly, resources are assigned to the order and a schedule according to which the order will be processed, is created (step S4). Then, there is determined a processing time (time during which the order will be actually processed) and a necessary time (overall time that is necessary to perform processing from the reception of the order to the delivery of a finished product, a time frame). That is, a schedule giving the time frame is created (step S5).

Finally, the schedule is monitored and, when an important (critical) interaction among operators is required, a notification is issued to the operators (step S6).

Figure 6:
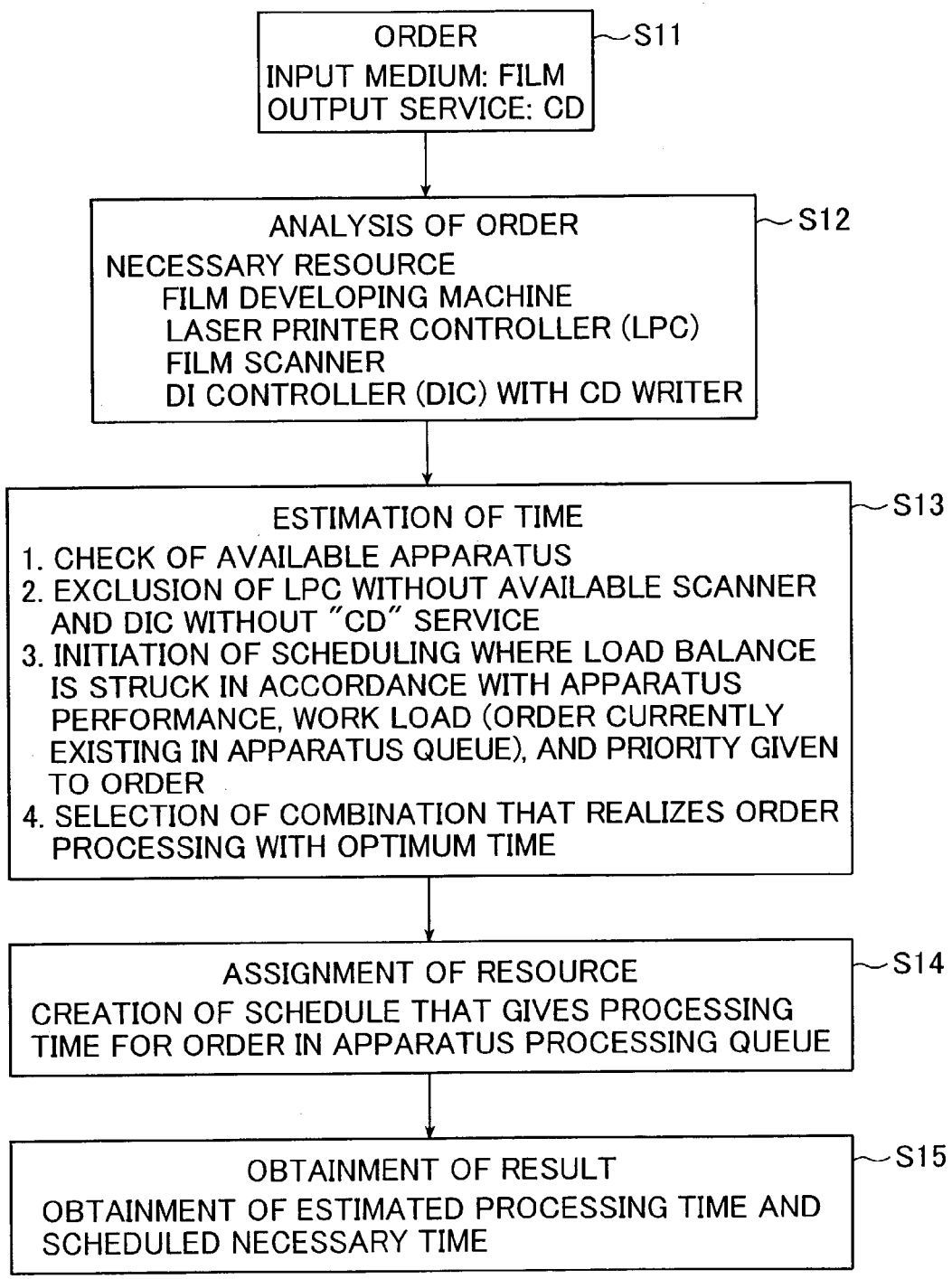
FIG. 6 is a flowchart of an example of specific processes in the order processing time prediction method shown in FIG. 5.

FIG. 6 shows an example of a flowchart of specific processes in the order processing time prediction method shown in FIG. 5.

First, in this example, an order whose input medium is a film and whose output service is a CD is registered (step S11).

Next, this order is analyzed. Then, it is determined that resources necessary to process this order are a film developing machine, a (laser) photo printer controller (LPC), a film scanner, and a digital image controller (DIC) with a CD writer (step S12).

Subsequently, a processing time for this order is estimated according to the procedure given below (step S13):
1. Confirmation of each available apparatus;
2. Exclusion of each unusable LPC which is not connected to the scanner, and each DIC without the "CD" service;
3. Initiation of the creation of a schedule (scheduling) where a balance is struck among loads in accordance with apparatus performance, work loads (orders that are currently in an apparatus queue, that is, orders that are currently waiting for the processing by the apparatuses), and the priorities given to the orders; and
4. Selection of a combination which enables order processing with an optimum time.

Following this, each available resource is determined and a processing time for the order is scheduled in the apparatus order processing queue (step S14).

Finally, a result of this processing is obtained. That is, an estimated processing time and a scheduled necessary time (time frame, a time from the reception of the order to the delivery of a finished commodity) are obtained (step S15).

The server 46 that performs the order information management, the customer information management, and the workflow management is basically constructed as described above.

In the print system 40 shown in FIG. 2, the photo printer 34 outputs photographic prints, a CD on which output image data obtained by performing image processing is recorded, and other finished commodities on which images have been recorded, from photographed images of a film, images of a developed film, or images recorded on a medium like DSC images. The photo printer 34 is hardware that is the heart of the print system 40 to which the management system 10 of the present invention is applied, and comprises a scanner (image reading apparatus) that photoelectrically reads film images through scanning and generates an image signal; an image processor (image processing apparatus) on which the main body software (A1 software) for operating and controlling the photo printer 34 itself is installed, which performs digital image processing on input image data of the film images read by the scanner or digital input image data obtained from a medium like a DSC by a media drive or the DI controller 50 provided in the order reception machine 42 or the automatic order reception machine 44, and which usually includes a PC or a work station (WS); a laser printer (image recording apparatus) that exposes printing paper to a laser beam modulated based on the output image data obtained by performing the image processing in the image processor and records images (latent images) on the printing paper; and a paper processor (printing paper processing apparatus) that performs development processing (development, bleaching, fixation, rinsing, drying, sorting) on the exposed printing paper (latent images thereon).

Needless to say, the image processor is equipped with a monitor, a keyboard, a mouse, a storage apparatus (HDD) for storing image data of a plurality of frames, and the like.

Further, the image processor of the photo printer 34 is equipped with the photographic image data accumulation image archive 48 in which photographic image data such as input image data of images read by the scanner, input image data of DSC images, and output image data obtained from these input image data are stored for a predetermined time period.

Here, in addition to the main body software that operates and controls the photo printer 34 itself, the photo printer software for performing the operation automation and the workflow display (processing work order display or processing state display) that is linked to the main body software is installed on the image processor of the photo printer 34. That is, the image processor of the photo printer 34 is equipped with the photo printer automatic setting function module 24 and the workflow display function module 22 that constitute the photo printer software.

The management system 10 of the present invention in which the photo printer 34 (image processor) is equipped with the automatic setting function module 24 and the workflow display function module 22 eliminates the necessity for an operator to read instructions written on a DP (development and print) envelope and to set up an apparatus for producing a desired output, which enables improvement in productivity and reduction in cost. In the present invention, in order to produce a product according to an order received, details of the order are obtained from databases such as the order DB 30, and the apparatus is automatically set up and is operated in accordance with the obtained order details, thereby automating an order processing process. The order history and preference of each customer is stored and is used as a guideline when an additional order is received.

Here, the purpose of the order automatic setting function (order automation) is to save the labor required for the repetitive inputting of order information at different stages of order processing, thereby improving the efficiency in an order processing process.

Figure 7:
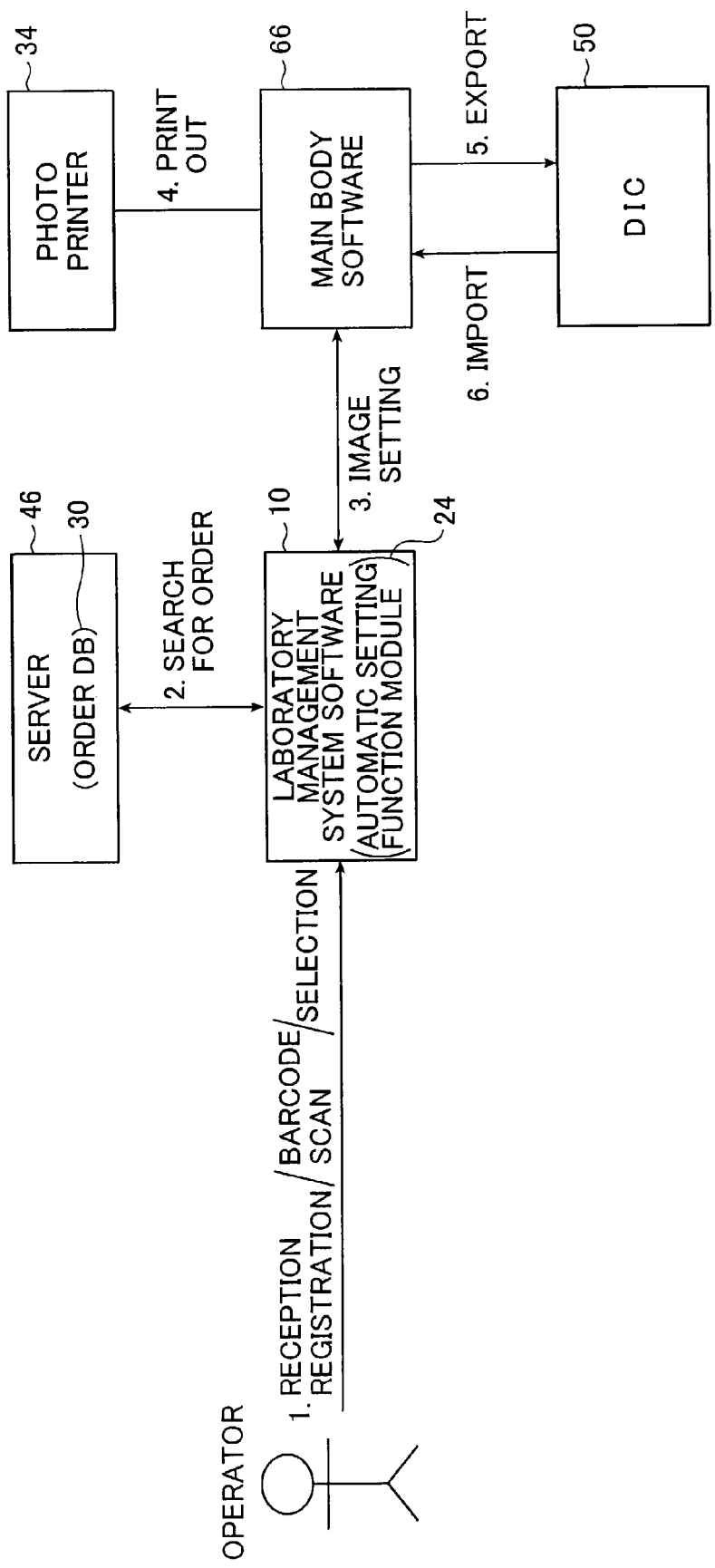
FIG. 7 is a block diagram showing an example of a workflow of a film order process in the photo laboratory management system of the present invention.

FIG. 7 shows an example of a workflow of a film order process.

order information is inputted (received and registered) at the counter of a laboratory, the barcode of a customer card is scanned, and the order information is stored in the order DB 30 of the server 46 in the laboratory management system 10. The order information is searched for in the photo printer PC (image processor) when an operator scans the barcode or an order ID is manually inputted. It is possible for the operator to select an order to be processed by double-clicking the order using the workflow display function module (workflow adviser) 22. Laboratory management system software (lab manager) is used to have order information (print size, print quality) obtained as a result of the search interact with the main body (A1) software in order to automate photograph order processing. After the order processing, an image file is transferred to a long-term storage and is managed therein for the sake of guaranteeing quality or as a preparation to an additional order.

The order automatic setting function (order automation) has an automatic mode and a semi-automatic mode.

Here, when the automatic mode is set, the sole interaction performed by the operator is the scanning or inputting of an order ID at the photo printer PC. The laboratory management system software automatically sends an order to the photo printer 34 or the digital image controller (DIC) 50 in order to process the order.

On the other hand, when the semi-automatic mode is set, the operator can decide, before image processing is performed, whether the laboratory management system software is to be set at "semi-automatic mode" in which an image parameter can be amended.

In the case of an order for a film, as a result of the order automation, it becomes possible to process an image file for outputting in different forms such as prints and a digital media, by merely scanning the film once.

Figure 8:
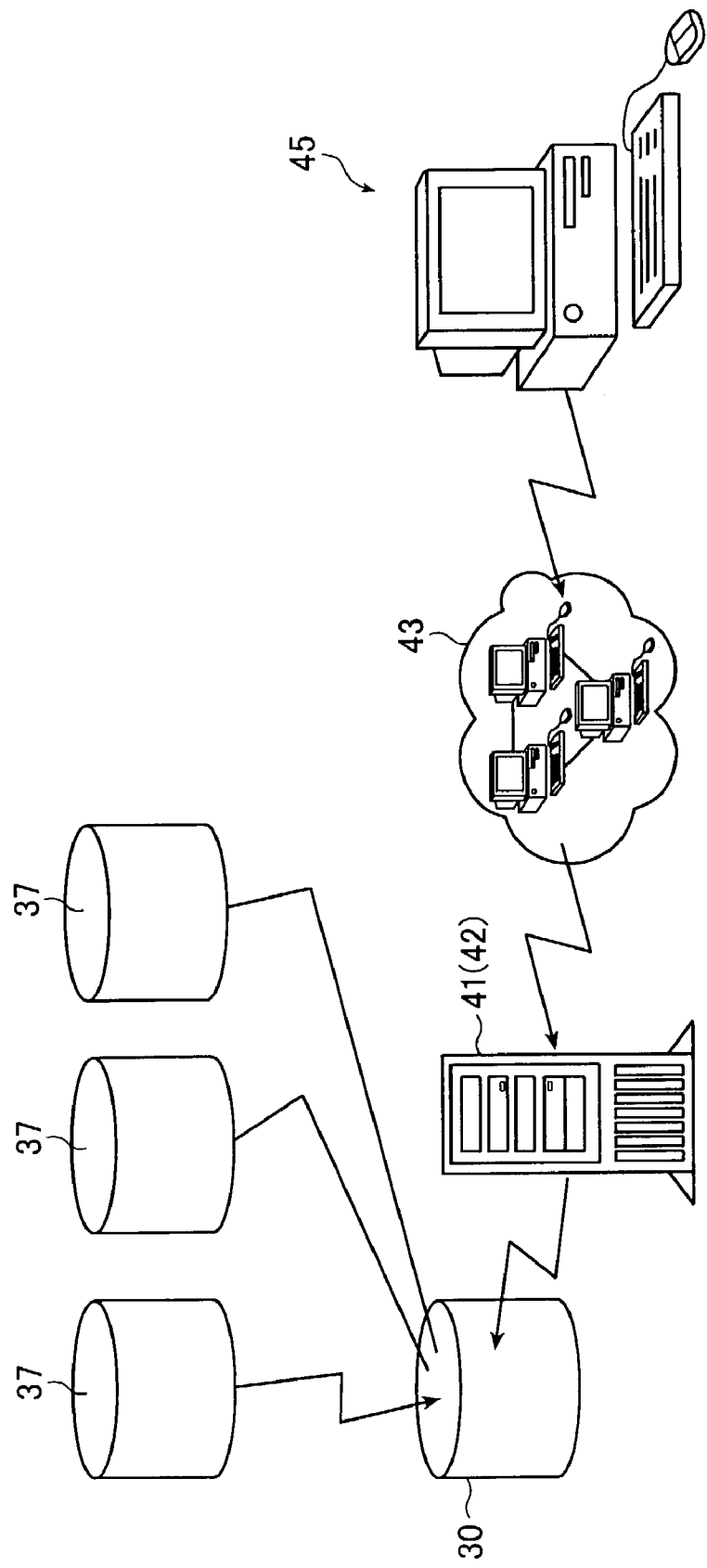
FIG. 8 is a block diagram showing an example of a workflow where an order for a digital medium service is processed in the photo laboratory management system of the present invention.

FIG. 8 shows an example of a workflow of the processing of an order for a digital medium.

An order for a digital medium is inputted at the counter of a laboratory. order information is stored in the order management database (order DB 30) from three databases (DB 37) and related images are uploaded to an order management FTP site.

The workflow display function module (workflow manager) and the digital order processor periodically poll data for a new order. If data exists, the data is processed and the order is sent to the digital image controller.

An order for a digital medium is also inputted from a client PC 45 into the server 41 (42) via a network 43, and the order inputted into the server 41 is sent to the order management database.

The order automation processing at the photo printer 34 includes reading the barcode of a DP envelope, using the barcode as a retrieval key to read order contents out of the order DB 30 and automatically setting an operation condition or a service condition under which the photo printer 34 performs processing that satisfies the order contents, with reference to the read-out order contents. Conventionally, during this setting of the operation condition or service condition, an operator manually inputted the conditions one by one. Consequently, this setting was performed at much expense in time and effort and there inevitably occurred errors. However, the order automation processing according to the present invention, that is, the order automatic setting (order automatic setting to the photo printer) is not a time-consuming job and is performed with precision, which enables shortening of a processing time and reduction in cost.

The photo printer 34 that performs the order automation processing, the order automatic setting, and the workflow display is basically constructed as described above.

In the print system 40 shown in FIG. 2, the DI controller 50 reads out digital image data recorded on a DSC, CD, MO, FD, or another medium, records digital image data on these media (on a CD, in particular), and manages production information. Alternatively, in order to perform reprinting (remaking of prints), the DI controller 50 deals with digital image data accumulated in the image archive 48 of the photo printer 34. The DI controller 50 usually includes a drive for writing data onto a medium and reading the data out of the medium and a PC equipped with a reader/writer. It is needless to say that such a PC is equipped with a monitor, input devices including a keyboard and a mouse, and a memory and a storage apparatus (HDD) for temporarily storing image data, application, software, or the like.

In the illustrated case, the production information DB 36 is connected to this DI controller 50 as a database for storing production information.

Here, as described above, the DI controller 50 is equipped with the production information management function module 26 and the remake function module 28.

This construction makes it possible to realize displaying through a Web browser on a network, so that the production information can be displayed using any terminal or PC.

The production information includes production quantities for each of a plurality of devices in a photo laboratory, for each software, for each application, and for each print size, size-specific usage amounts of roll paper, the remaining amounts of the roll paper, and the like.

This production information can be effectively applied to the stock control of paper (CLP), pricing, and the like.

In the case where scan images are stored in the image archive 48, it is possible to obtain order information from the order DB 30 using the barcode of a DP envelope as a retrieval key, to obtain required images by searching the image archive 48 with reference to the obtained order information, and to perform remaking of prints or reordering without performing film scanning.

In addition, the office terminal 52 is placed rearward in an office or the like so that the production information described above can be displayed to perform production management together with sales management and customer management.

Customers, operators, and workers at a photo laboratory can refer to the customer order information, the production information, and the customer information, which are open to the public, via the communication network 54 such as the Internet by accessing from the outside of the photo laboratory.

The XML terminal 55 is used to connect the server 46 to the outside such as another photo printer, another system (in more detail, to the order reception machine, the automatic order reception machine, or the photo printer therein), Kiosk, or a network such as the MI network, thereby informing them of the order information, the production information, the status (state) of order processing and the like.

The photo laboratory management system of the present invention and the print system to which this system is applied are basically constructed as described above. How the photo laboratory management system and the print system operate will be described below.

Figure 9:
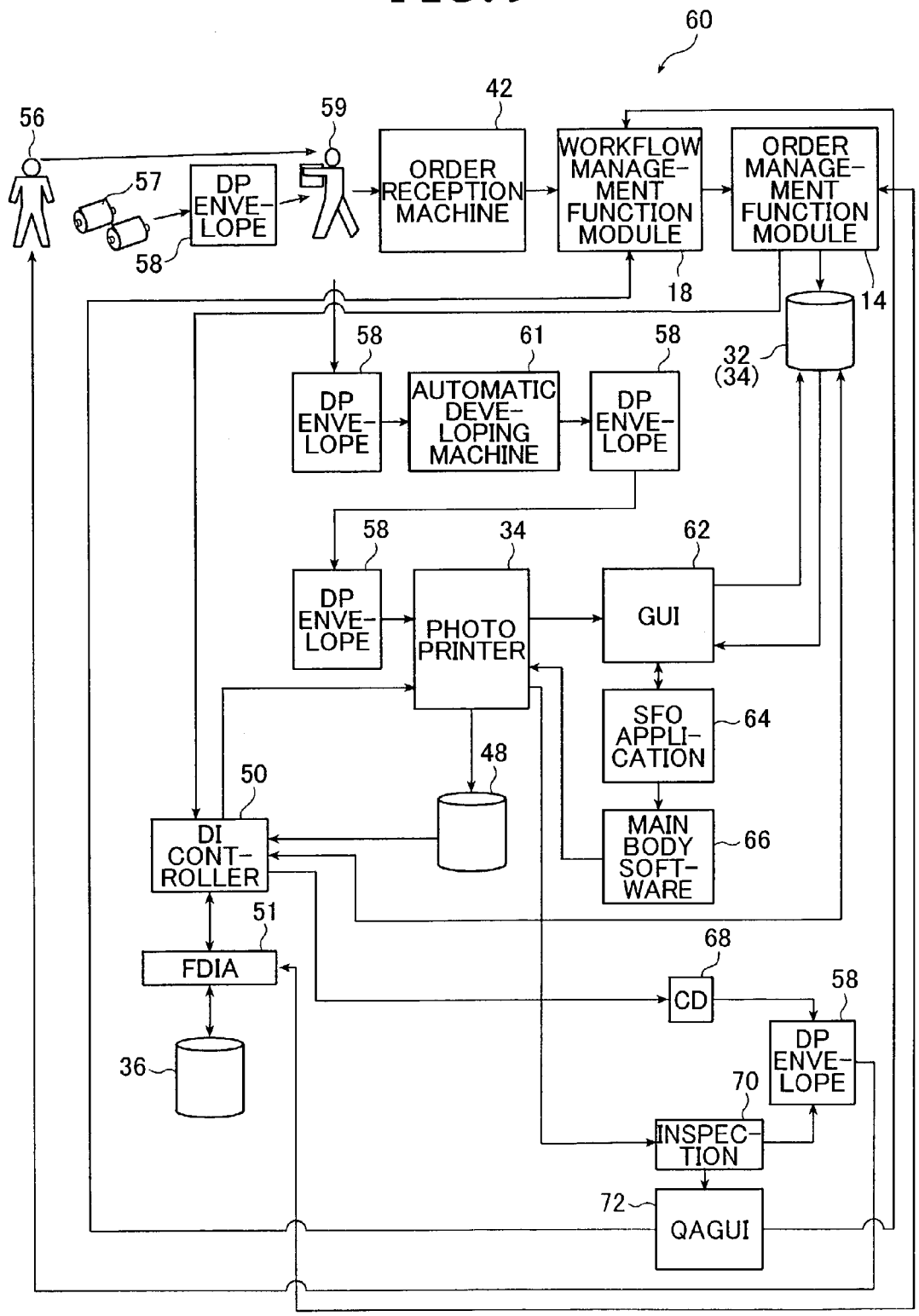
FIG. 9 is a block diagram showing the details of an example where a print service from a photographed film, a CD creation service, or a network uploading service is performed in the photo laboratory management system of the present invention.

FIG. 9 is an explanatory diagram for illustrating the details of an example of print service, CD creation service or network uploading service.

As shown in FIG. 9, a customer 56 brings a photographed film 57 to a photo laboratory, orders at least one of a print service, CD creation service, and network uploading service, and informs an operator 59 of the details of order contents (customer information and order information). Then, the photographed film 57 is put in a DP envelope 58 and a barcode seal is affixed to the DP envelope 58.

The operator 59 receives the order from the customer 56 and registers it using an order entry GUI 42 realized by the order entry function module 12. During this operation, the order information and the customer information are stored in the order DB 30 and the customer DB 32 via the workflow management function module 18 and the order management function module 14. In this process, the photographed film 57 may be put in the DP envelope 58.

The DP envelope 58 is sent to the automatic developing machine 61. The photographed film 57 put in the DP envelope 58 is taken out of the DP envelope 58 and is subjected to development processing at the automatic developing machine 61. The developed film 57 is put in the same DP envelope 58 again.

This DP envelope 58 is sent to the photo printer 34. This photo printer 34 reads the barcode on the DP envelope 58, thereby obtaining an order ID (No.). The photo printer 34 then sends the obtained order ID to the GUI 62 realized by the workflow display function module 22 through SFO application 64 of the automatic setting function module 24 in the photo printer 34.

During this operation, the GUI 62 that has obtained the order ID (No.) issues a request to obtain the details of the order from the order DB 30. In response to this request, the details of the order are sent from the order DB 30 to the GUI 62. The order details are automatically set in the photo printer 34 via the GUI 62, the SFO application 64, and the main body software of the photo printer 34.

Here, when the developed film 57 put in the DP envelope 58 is loaded in the scanner of the photo printer 34, the photo printer 34 performs photoelectrical reading of images on the film in accordance with the automatically set order details, performs various kinds of image processing on an obtained image signal, exposes printing paper to a laser beam modulated based on the obtained image data, and performs processing such as development, thereby producing prints.

The output image data (image file) whose print production has been completed is stored in the image archive 48.

The produced prints are forwarded to inspection 70. If a good inspection result is obtained, the prints are put in the DP envelope 58 along with the developed film and an index print and are delivered to the customer 56.

If a good inspection result is not obtained, remake conditions and the like are inputted using a QAGUI 72 realized by the remake function module 28 and are returned to the workflow management function module 18 and the creation of prints is performed again. In this case, however, the scan image data stored in the image archive 48 is used, so that it is not required to scan the developed film, which realizes savings in time and in labor.

On the other hand, in the case where the CD creation service is ordered, the DI controller 50 searches the order DB 30 for details of the order and reads the order details from the order DB 30. Following this, the DI controller 50 accesses the photo printer 34 and sends the order details thereto. After that, although prints are not outputted, the photo printer 34 performs substantially the same processing as in the case where the print service is ordered, and an image file (output image data) is stored in the image archive 48.

The DI controller 50 accesses the image archive 48, searches for the image file, reads out the image file, and records the image file on a CD using a built-in CD writer. A CD 68 on which the necessary image file has been recorded in accordance with the order is put in the DP envelope 58 along with the developed film and is delivered to the customer 56.

Needless to say, when the print service and the CD creation service are both ordered, prints and a CD are put in the DP envelope 58 along with the developed film and an index print and are delivered to the customer 56.

Further, an image file or production information read out by the DI controller 50 may be outputted from the FDIA 51 onto a network to provide the network uploading service. The read out data may also be stored in the production information DB 36.

The print service, CD creation service, and network uploading service from a photographed film are basically performed as described above.

As described above, the management system 10 of the present invention is provided with various function modules described above. As a result, at a photo laboratory having the print system 40 that includes the digital photo printer 34, it is possible to manage the workflow in the laboratory from the order reception processing at a counter, through the print processing, CD creation processing, to the delivery of a finished commodity. It is also possible to enhance workability and operability and to improve productivity.

That is, firstly, the time required before delivering photographic prints or a CD to a customer as well as a printing procedure and a CD creation procedure with which the print system 40 can make full use of production capacity can be automatically calculated for scheduling. Accordingly, it becomes possible to perform production management without difficulty.

Secondly, it is possible to automatically obtain a finished commodity in accordance with the contents of an order received for printing or CD creation by merely reading once information on a barcode of a DP envelope or the like. That is, simplified order input and other operations become possible in the photo printer 34.

Thirdly, order information of each customer can be compiled into a database, which enables management of customer information, production, and sales.

In the management system of the present invention, the functions and effects described below can be achieved by utilizing the above-mentioned function modules in combination.

(1) It is possible to manage the workflow in a photo laboratory.
(2) It is possible to increase the work efficiency at the photo laboratory and to enhance the productivity.
(3) Various kinds of setting functions are provided, so that it is possible to cope with various devices including a photo printer with flexibility.
(4) It is possible to establish a desired connection with another system using XML.
(5) Various kinds of functions are incorporated in the system, which can reduce the burden on an operator.

In particular, the photo printer automatic setting function module 24 for simplified operation and automation of the photo printer 34, the remake function module 28 for reprinting (remaking of prints) when a trouble occurred, the workflow (process state) display function module 24 for managing a delivery time, and the like are incorporated in the system.

(6) Various kinds of production states in the laboratory can be grasped in the rearward (office) or another remote place.

In particular, the order tracking function module 20 that performs the management of an order processing state, the production information management function module 26 that performs the production management, and the like are incorporated.

(7) It is possible to perform the collective management of customer information, to improve workability in the reception of an order, to perform speedy order reception with reliability, and to serve a customer in a friendly and precise manner.

The photo laboratory system according to the present invention has been described in detail above based on various embodiments, although the present invention is not limited to the embodiments described above. That is, needless to say, it is possible to make various kinds of modifications and changes without departing from the gist of the present invention.

As has been described in detail above, the present invention is capable of managing a photo laboratory by having various functions for managing a workflow in a photo laboratory from the reception of an order with an input image, through the output of an output image, to the delivery of the output image to a customer, for enhancing workability and operability concerning a multifunctional digital photo printer, and for improving productivity.

The present invention is also capable of preventing the lowering of productivity due to the diversification of input/output services provided by a digital photo print system resulting from the advancement of digitalization of services provided at a photo laboratory, making full use of the functions and high capacity of a multifunctional digital photo printer, presenting a new value-added service with which the amount of sales at the photo laboratory can be increased, and presenting various measures to improve productivity, improve a system capacity, enhance operability, and realize cost reduction.

The present invention is further capable of providing order automation, more specifically, realizing order automation with which the efficiency in an order processing process can be improved by saving the labor required for the repetitive inputting of order information at different stages of order processing.

The present invention is further capable of automatically estimating a time required to process an order in accordance with a priority, currently available resources, and a work load so that an optimum time limit is set and a product can be delivered on time.

What is claimed is:

1. A method of photo laboratory management for managing a photo laboratory utilizing a digital photo print system by which a customer is provided with an image output service for outputting an output image including at least one of a photographic print and photographic output image data from an original image including at least one of the photographic film and photographic input image data, the method comprising:
receiving an order from said customer by receiving order information that includes at least identification information of said customer, a type and a form of said original image from said customer, a type, a form, and a number of copies of said output image ordered by said customer; managing the order information received from said customer; managing a schedule according to which said order received from the said customer is to be processed, and predicting a time required for finishing said output image ordered by said customer; automatically setting, in accordance with said order information from the said customer, a digital photo printer which obtains said original image as digital image data and outputs said output image from the obtained digital image, wherein said order information received from said customer is in an order database in association with said identification information of the said customer, and wherein when said identification information of said customer is inputted, said order information from the said customer is searched in said order database based on said input identification information of said customer to obtain said order information from the said customer and said digital photo printer is automatically set in accordance with said obtained order information; and wherein at least one hardware resource is selected among two or more hardware resources which constitute said digital photo print system and output said output image, with which said order from said customer is processed, in accordance with structure, performance, work load of each of said two or more hardware resources and a priority of said order from said customer; said schedule of order processing is created: said schedule is managed; and a time required for finishing said output image ordered by said customer based on said schedule is predicted.

2. The method of photo laboratory management according to claim 1, wherein hardware resources of said digital photo print system include an order reception machine for receiving an order from said customer, a server for managing the order information received from said customer, managing a schedule for processing said order received from the customer and predicting a finishing time, and a digital photo printer for obtaining said original image as digital image data and outputting said output image from the obtained digital image data.

3. The method of photo laboratory management according to claim 1, comprising managing customer information.

4. The method of photo laboratory management according to claim 1, comprising specifying said order from said customer and checking a state of the specified order.

5. The method of photo laboratory management according to claim 1, further comprising displaying on a display device a list in which said order from said customer is arranged in a sequence of processing,
wherein when said order from said customer in said list displayed on said display device is selected, said order information from said customer is searched in said order database to obtain said order information from said customer and said digital photo printer is automatically set in accordance with said obtained order information.

6. The method of photo laboratory management according to claim 1, further comprising managing production information concerning said digital photo print system.

7. The method of photo laboratory management according to claim 1, further comprising remaking said output image in the digital photo printer that obtains said original image as digital image data and outputs said output image from the obtained digital image data.

8. The method of photo laboratory management according to claim 1, wherein said at least one hardware resource is selected and said schedule is created such that processing time of said order from said customer becomes an optimum time.

* * * * *